United States Patent
Issa

(10) Patent No.: US 9,356,823 B2
(45) Date of Patent: *May 31, 2016

(54) PROVIDING AND RECEIVING CONTENT FOR COMPUTER NETWORKS USING A GATEWAY AND SERVER

(71) Applicant: Qurio Holdings, Inc., Raleigh, NC (US)

(72) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/963,512

(22) Filed: Aug. 9, 2013

(65) Prior Publication Data

US 2013/0326017 A1 Dec. 5, 2013

Related U.S. Application Data

(63) Continuation of application No. 11/239,978, filed on Sep. 30, 2005, now Pat. No. 8,516,135.

(51) Int. Cl.
*G06F 15/16* (2006.01)
*H04L 29/10* (2006.01)
*H04N 7/173* (2011.01)
*H04N 21/25* (2011.01)
(Continued)

(52) U.S. Cl.
CPC ............ *H04L 29/10* (2013.01); *H04L 67/2871* (2013.01); *H04L 67/306* (2013.01); *H04N 7/17318* (2013.01); *H04N 21/251* (2013.01); *H04N 21/25816* (2013.01); *H04N 21/25833* (2013.01); *H04N 21/25891* (2013.01); *H04N 21/2743* (2013.01); *H04N 21/4108* (2013.01); *H04N 21/4126* (2013.01); *H04N 21/41407* (2013.01); *H04N 21/4331* (2013.01); *H04N 21/43615* (2013.01); *H04N 21/485* (2013.01); *H04N 21/4825* (2013.01); *H04N 21/4826* (2013.01); *H04N 21/6582* (2013.01); *H04L 67/2838* (2013.01)

(58) Field of Classification Search
None
See application file for complete search history.

(56) References Cited

U.S. PATENT DOCUMENTS 5,708,780 A 1/1998 Levergood et al.
6,138,158 A 10/2000 Boyle et al.
(Continued)

FOREIGN PATENT DOCUMENTS

KR 669157 B1 1/2005

OTHER PUBLICATIONS

Bouju, Alain et al., "Client-server Architecture for Accessing Multimedia and Geographic Databases within Embedded Systems," Proceedings of the 10th International Workshop on Database and Expert Systems Applications, Sep. 1-3, 1999, pp. 760-764.
(Continued)

*Primary Examiner* — Jeffrey R Swearingen
(74) *Attorney, Agent, or Firm* — Withrow & Terranova, PLLC

(57) ABSTRACT

Providing and receiving content for nodes of a computer network. In one aspect, a method for receiving content for nodes on a network includes establishing a computer device as a gateway device that can communicate in a first network and communicate with a server in a second network. The gateway device makes a request for content to be provided to at least one destination node in the first network. The requested content is received at the gateway device and is then provided to the destination node, where the received content is based on stored settings for the at least one destination node.

22 Claims, 5 Drawing Sheets

(51) Int. Cl.
*H04N 21/258* (2011.01)
*H04N 21/2743* (2011.01)
*H04N 21/41* (2011.01)
*H04N 21/414* (2011.01)
*H04N 21/433* (2011.01)
*H04N 21/436* (2011.01)
*H04N 21/482* (2011.01)
*H04N 21/485* (2011.01)
*H04N 21/658* (2011.01)
*H04L 29/08* (2006.01)

(56) References Cited

U.S. PATENT DOCUMENTS

| | | | |
|---|---|---|---|
| 6,160,804 A | 12/2000 | Ahmed et al. |
| 6,249,913 B1 | 6/2001 | Galipeau et al. |
| 6,438,579 B1 | 8/2002 | Hosken |
| 6,662,231 B1 | 12/2003 | Drosset et al. |
| 6,671,807 B1 | 12/2003 | Jaisimha et al. |
| 6,721,297 B2 | 4/2004 | Korus et al. |
| 6,757,719 B1 | 6/2004 | Lightman et al. |
| 6,799,201 B1 | 9/2004 | Lee et al. |
| 6,847,819 B1 | 1/2005 | Sprigg et al. |
| 6,901,429 B2 | 5/2005 | Dowling |
| 6,959,288 B1 | 10/2005 | Medina et al. |
| 7,103,583 B1 | 9/2006 | Baum et al. |
| 7,149,772 B1 | 12/2006 | Kalavade |
| 7,200,575 B2 | 4/2007 | Hans et al. |
| 7,302,465 B2 | 11/2007 | Ayres et al. |
| 7,346,028 B2 | 3/2008 | Pattenden et al. |
| 7,403,910 B1 | 7/2008 | Hastings et al. |
| 7,447,779 B2 | 11/2008 | Fujii |
| 7,490,136 B2 | 2/2009 | Suzuki |
| 7,548,915 B2 | 6/2009 | Ramer et al. |
| 7,617,127 B2 | 11/2009 | Hunt et al. |
| 2003/0078986 A1 | 4/2003 | Ayres et al. |
| 2004/0193609 A1 | 9/2004 | Phan et al. |
| 2006/0168126 A1 | 7/2006 | Costa-Requena et al. |
| 2007/0174471 A1 | 7/2007 | Van Rossum |

OTHER PUBLICATIONS

Zhang, Dongsong, "Delivery of Personalized and Adaptive Content to Mobile Devices: A Framework and Enabling Technology," Communications of the Association for Information Systems, vol. 12, No. 1, Article 13, Aug. 9, 2003, 22 pages.

International Search Report for PCT/US2006/35682, mailed May 6, 2008, 11 pages.

Non-Final Office Action for U.S. Appl. No. 11/239,978, mailed Jun. 23, 2009, 11 pages.

Final Office Action for U.S. Appl. No. 11/239,978, mailed Jan. 6, 2010, 21 pages.

Advisory Action for U.S. Appl. No. 11/239,978, mailed Apr. 14, 2010, 3 pages.

Non-Final Office Action for U.S. Appl. No. 11/239,978, mailed Sep. 22, 2011, 21 pages.

Final Office Action for U.S. Appl. No. 11/239,978, mailed Mar. 19, 2012, 20 pages.

Non-Final Office Action for U.S. Appl. No. 11/239,978, mailed Nov. 2, 2012, 13 pages.

Notice of Allowance for U.S. Appl. No. 11/239,978, mailed Apr. 17, 2013, 8 pages.

PROVIDING AND RECEIVING CONTENT FOR COMPUTER NETWORKS USING A GATEWAY AND SERVER

RELATED APPLICATION

The present application is related to U.S. patent application Ser. No. 11/239,978, now U.S. Pat. No. 8,516,135, entitled PROVIDING AND RECEIVING CONTENT FOR COMPUTER NETWORKS USING A GATEWAY AND SERVER, which was filed on Sep. 30, 2005, the disclosure of which is hereby incorporated herein in its entirety by reference.

FIELD OF THE INVENTION

The present invention relates to computer networks, and more particularly to providing content from a server and receiving the content at nodes on a computer network.

BACKGROUND OF THE INVENTION

Computer networks are used in a variety of applications and environments to enable communication between computer devices. Some networks are connected such that computer nodes in the network communicate via physical cables or wires. Other networks can include wireless connections, so that the computer nodes can communicate using wireless signals, e.g., radio frequency, infrared, or other signals.

Some computer networks can include portable computer devices, such as laptop computers, personal digital assistants (PDAs), cell phones, game devices, etc. One type of network that often includes portable devices is a personal area network (PAN). A PAN is a computer network used for communication among computer devices that are typically physically close to a user. For example, the range of communication between devices in a PAN is typically a few meters. PANs may have physical wired connections, as with computer buses such as USB and Firewire. A wireless personal area network (WPAN) is more often used, with network technologies such as Bluetooth®, IrDA®, and Zigbee™.

For example, Bluetooth provides a way to connect and exchange information between devices such as personal digital assistants (PDAs), mobile phones, laptops, PCs, printers and digital cameras via a secure, low-cost, globally available short range radio frequency. Bluetooth lets these devices talk to each other when they come in range, typically 10 to 100 meters of each other, depending on the power class of the product. A Bluetooth PAN (also known as a piconet) is composed of up to 8 active devices in a master-slave relationship.

One problem with existing computer networks is that content, such as images, music, etc., is often not stored within the network, but is stored remotely to the network on a server. This is even more often true for personal area networks. For example, photos may be stored on a photo website, remotely from a display screen in a PAN. Moreover, desired remote content is not easily retrieved from other networks and servers. For example, a computer device typically makes a simple connection to a server, and the user must figure out what content he or she wants to download, and then manually and tediously navigate through all the content on the server to find particular content to download. The content must then be forwarded to a desired device or node. This same procedure must be repeated each time the user connects to another network, which may occur frequently if the user uses a portable device and often moves into different wireless networks such as PANs, for example. In addition, any downloading preferences the user may have will not be available when using other devices to download content, or in other networks.

Accordingly, there is a need for a method and system allowing appropriate content from a server to be easily found and provided to nodes in a network, and for user preferences and node characteristics to be known by a server even when a user uses different computer devices or networks to connect to the server. The present invention addresses such a need.

SUMMARY OF THE INVENTION

The invention of the present application relates to providing and receiving content for nodes of a computer network. In one aspect of the invention, a method for receiving content for nodes on a network includes establishing a computer device as a gateway device, the gateway device operative to communicate in a first network and communicate with a server in a second network. The method includes communicating with the server from the gateway device to make a request for content to be provided to at least one destination node in the first network, where the content is stored at the server. The requested content is received at the gateway device and that content is provided to the at least one destination node, where the received content is based on stored settings for the at least one destination node. A similar aspect of the invention provides a computer readable medium for implementing similar features.

In another aspect of the invention, a method for providing content to nodes on a computer network includes receiving a request at a server from a gateway device for content stored at the server, where the gateway device is operative to communicate with a first network and communicate with the server via a second network. An identification of at least one destination node in the first network that is to receive the requested content is received at the server from the gateway device. The requested content is provided to the gateway device so that the gateway device can provide the requested content to the at least one destination node, where the requested content is based on settings stored at the server for the at least one destination node.

In another aspect of the invention, a network system includes a first network, including a plurality of nodes and a gateway device, and a server capable of communication with the gateway device via a second network. The server is configured to receive a request from the gateway device for content stored at the server to be provided to at least one destination node in the first network, and receive from the gateway device an identification of the at least one destination node. The server provides the requested content to the gateway device so that the gateway device can provide the requested content to the at least one destination node, where the requested content is based on settings stored at the server and associated with the at least one destination node.

The present invention provides a method and system that allows a user to conveniently download content from a content server and provide that content to a device on a different network, such as a personal area network. The downloaded content can be specifically and automatically customized for use with particular devices on the network. Furthermore, the settings for nodes and types of devices in the network can be known even if downloading content using different devices or across different networks.

DETAILED DESCRIPTION

The present invention relates to computer networks, and more particularly to providing content from a server and receiving the content at nodes on a computer network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

Figure 1:
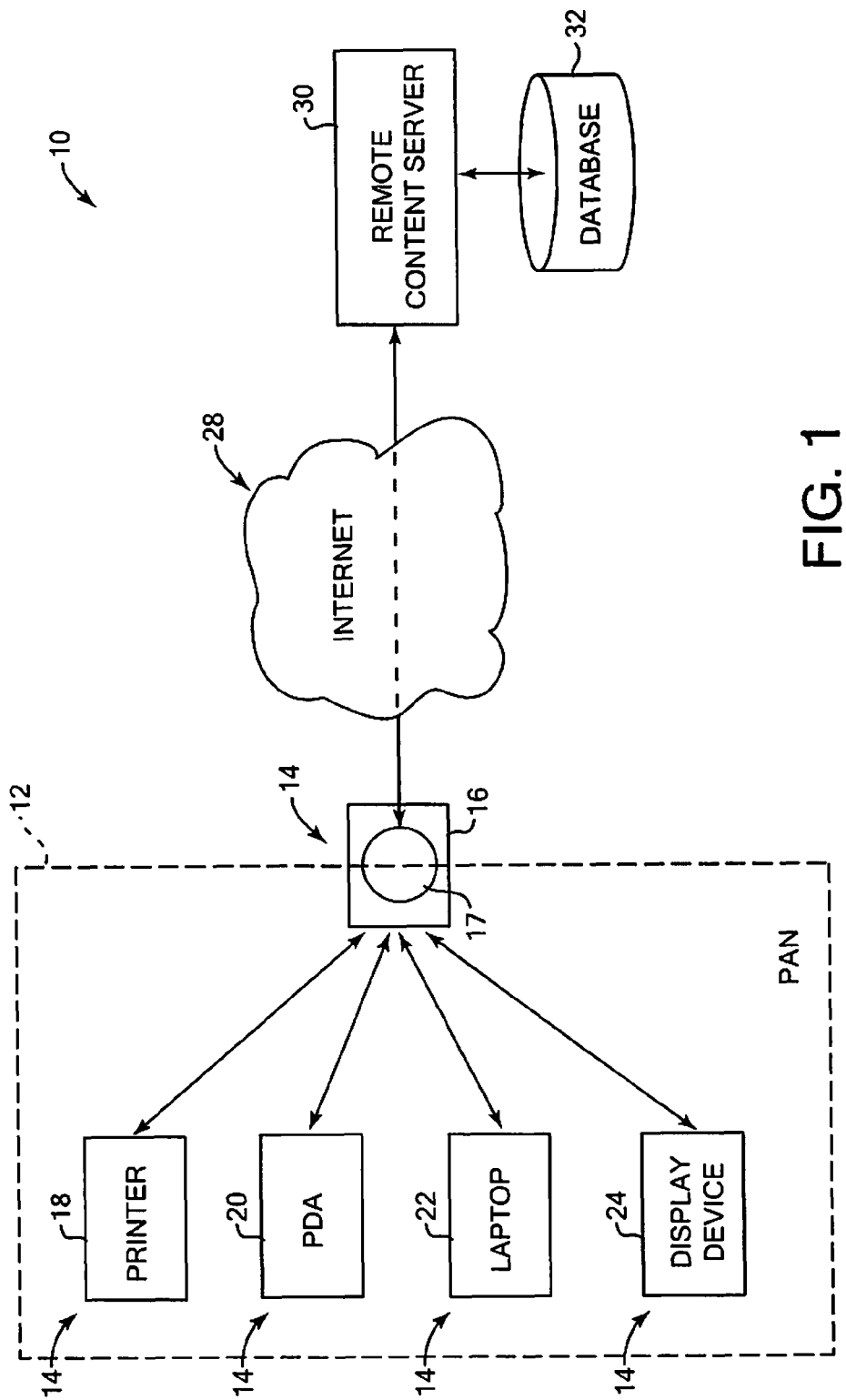
FIG. 1 is a block diagram illustrating an example of a network system suitable for use with the present invention.

FIG. 1 is a block diagram of an example of a network system 10 suitable for use with the present invention. System 10 includes a network 12 that allows multiple nodes 14 to communicate with other nodes to allow the sharing of information between the nodes. Each node 14 is a computer device that can send and/or receive data over the network 12. For example, a node 14 can be a desktop computer (PC), workstation, laptop computer, personal digital assistant (PDA), cellular telephone, game device, or other electronic device which can process data and run appropriate software. A node 14 can also be an output device, such as a display device or printer device, or an input device, such as a scanner, camera, microphone, etc. In the example shown, the nodes 14 include a gateway device 16 (such as a cell phone or PDA), a printer 18, a PDA 20, a portable laptop computer 22, and a display device 24 (such as an LCD flat-panel display screen). Other devices can be included in other embodiments, such as desktop computers, game devices, electronic appliances, automobile systems, interface devices (mouse, keyboard), headsets (that are for communicating with device 16), etc. Each node 14 and gateway device 16 can include such components as a microprocessor, display screen, memory (RAM and/or ROM), interface components, storage devices (e.g., hard drives), etc.

In one described embodiment, the network 12 is a personal area network (PAN), which allows communication between nodes within typically short distances of each other. Furthermore, network 12 can be a wireless personal area network (WPAN). This type of network allows wireless communication between nodes 14 in the network 12 over a limited range of wireless signals. For example, the wireless network can be implemented using a standard protocol, such as IEEE 802.11 (WiFi), Bluetooth®, Zigbee™, or other standard. When using some protocols such as Bluetooth (in which the network 12 is known as a piconet), the range of the wireless signals of the network are typically 10 or 100 meters, depending on the power class of the devices at the nodes 14.

For example, when using the Bluetooth standard for the network 12, the devices communicate using short range radio frequencies. Bluetooth allows compatible devices to communicate with each other when they come into range. Each of the devices at nodes 14 of the network 12 is required to be Bluetooth-compatible to be part of the Bluetooth PAN 12. A Bluetooth PAN can include up to eight active devices in a master-slave relationship, where the first Bluetooth device is considered the master, and the other nodes are slaves that communicate with the master. In the example of FIG. 1, the cell phone (gateway device) 16 has been moved into wireless Bluetooth range of the other devices at the nodes 14, has communicated with other devices, and is considered the master. The other devices 14 thus all communicate with the cell phone 16, and can communicate with each other through the cell phone 16. In other embodiments, other nodes 14 can act as the master.

Some Bluetooth implementations include a Basic Imaging Profile (BIP), which is a software routine that runs on a Bluetooth device and allows file image transfers between Bluetooth devices, including changing an image into a format that a device can read, and providing basic remote control capabilities. Devices using a BIP can push or pull data over the network 12 to or from other devices.

Figure 2:
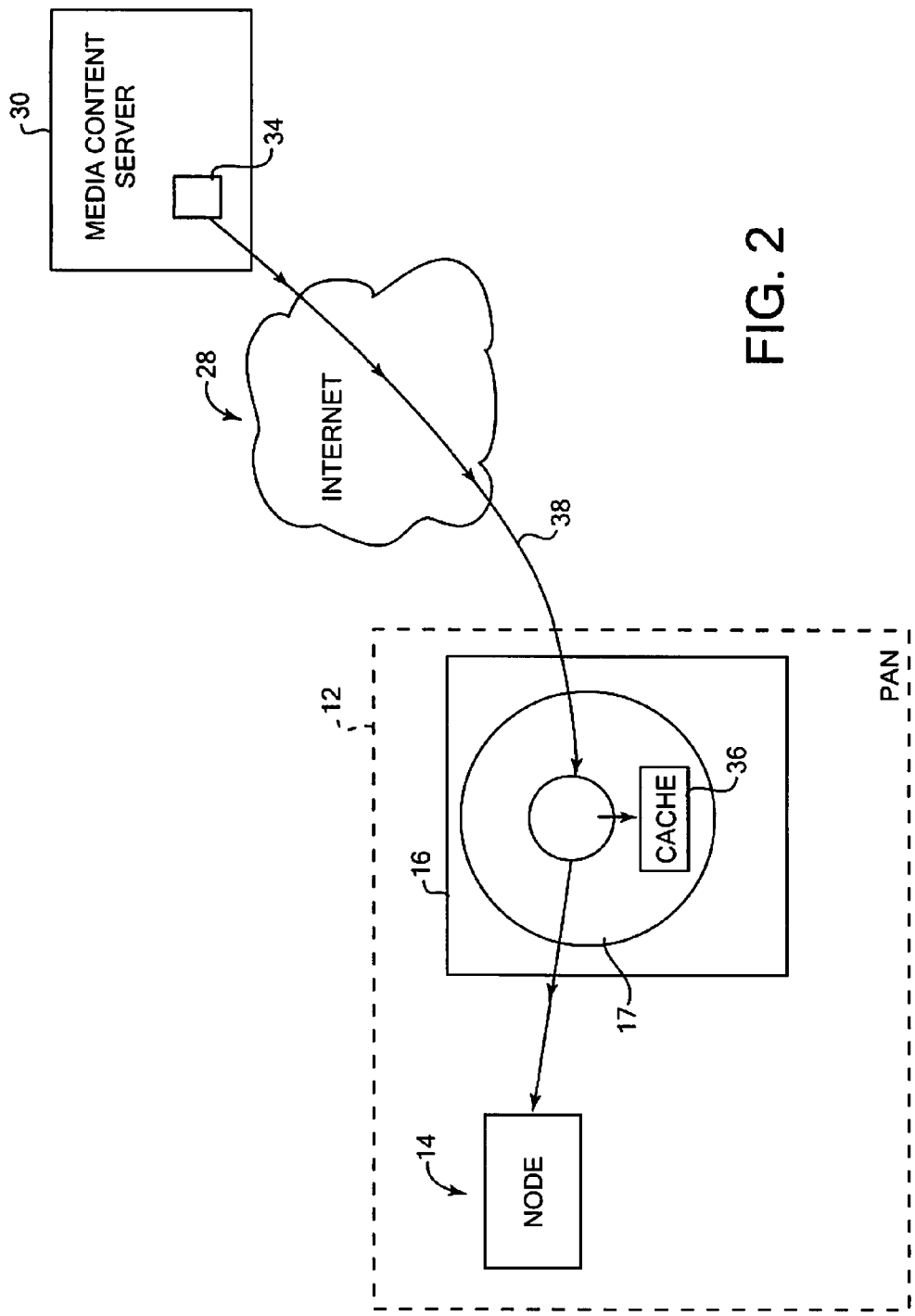
FIG. 2 is a diagrammatic illustration of an example of downloading content to a gateway and to a network node using the system of FIG. 1.

In the described embodiment, one of the nodes 14, i.e., gateway device 16, acts as a gateway to another network. In the embodiment of FIGS. 1 and 2, the gateway device 16 provides a gateway 17 to a network 28, which in this example is the Internet 28. Gateway 17 can be, for example, software running on the gateway device 16 and enabling the gateway functionality in combination with hardware of the gateway device 16. For example, a cell phone 16 can have a wireless cellular connection to the Internet. Other devices, if provided with and implementing a gateway 17, could have similar wireless internet connections, or wired internet connections.

The gateway device 16 can communicate via gateway 17 with a remote media content server 30 through network 28, which in this example is the internet 28. The second network 28 typically is implemented using a different network protocol than the first network 12, so that the gateway device 16 must be able to communicate using the network protocols for each of the networks 12 and 28.

The remote server 30 is a server that can provide data to requesting devices, and can be implemented using any suitable computer device. In the described embodiment, the content to be accessed on server 30 is private content for the user of the gateway device 16 and requires authentication information from the gateway device 16 to allow access to the user's data. In other embodiments, the user's content can be publicly accessible or accessible to particular designated users or nodes or node types. The server 30 includes a database 32 to store information, including content which the user of the gateway device 16 may be interested in. The database can be implemented on any suitable data storage device. The database 32 can store content in database 32 from multiple users that can access the server 30 over the internet 28. Content can include images, movies, audio and sound files such as for music, presentations, text, or other media or multi-media content. This content may have previously originated with the user of the gateway device 16, and/or from other users that connected to the server 30. Multiple gateway devices 16 from different networks similar to network 12 can be connected to the remote server 30 simultaneously. The content can be organized into various categories by the user or by the server 30, based on the content's subject matter, time of creation, creator, or other characteristics.

The user of the gateway device 16 can use the gateway 17 to download or pull content from the server 30 over the network 28. The received content can then be provided to one or more nodes 14 on the network 12 to be stored, displayed, output, or otherwise manipulated. For example, a cell phone 16 can download image content from remote server 30 and send that content to display device 24 over the PAN 12 using Bluetooth, and the display device 24 could then display the images on a display screen. Likewise, music data could be downloaded from server 30 and pushed to a device such as an MP3 player to output the music data as audio music. In some embodiments, the gateway 17 can cache the content it receives from the server 30 in a content cache.

The gateway device 16 runs software that includes an interface that allows the user to select desired content on the remote server 30 to download and route to nodes 14 of the network 12. The user may also request recommended content from the server, or randomly-selected content from the server. One embodiment of this interface is described in greater detail below with respect to FIG. 3. The user can select one or more nodes 14 on the network 12 which the user wishes to send the content to, and, before providing the content, the server 30 can authenticate each destination node to make sure the node is authorized to receive the content. This is described in greater detail with respect to FIGS. 4 and 5. In some instances, the gateway device 16 itself can be designated as a destination node.

The system configuration of FIG. 1 allows a great deal of flexibility and convenience to the user who wishes to download content. A user can bring a portable computer device, such as a cell phone, into range so that the device can connect to any network 12 and act as a gateway device to network 28. According to the present invention, the server 30 can access settings for the destination node (including for the type of device at the destination node) that allow customized downloading of content by the gateway device 16 in any network 12 that the user's device 16 connects to. This operation is described in greater detail with respect to FIGS. 4 and 5.

In some embodiments, multiple gateway devices 16 can be provided for a network 12. For example, one of the nodes 14 can also implement gateway software. Thus, multiple gateway devices can request and download content from the server 30 simultaneously; or, one gateway device can have priority (e.g., the first one to start downloading). Advantageously, the settings for the destination nodes are the same for both gateway devices 16, since they are stored at the server 30.

FIG. 2 is a block diagram illustrating the sending of content 34 from the remote content server 30 to the gateway 17 of the gateway device 16 via a network 28 such as the internet. The content 34 can be received over a network 28 via wireless links (such as WiFi, etc.) or wired links, as desired. There is an optional content cache 36 provided in the gateway 17 which can store some or all of the downloaded content 34. The gateway 17 routes the received content 34 to a node 14 within the network 12 using the protocol for network 12, such as a wireless link using the Bluetooth protocol as described above. The path for received content is represented by arrow 38.

The content 34 can be streamed so that as each data packet is downloaded to the gateway 17, the gateway routes the packet to the destination node 14. In other embodiments, the gateway 17 can download all of the content before sending it to the node 14.

In other embodiments, the network 12 can be implemented using a protocol and standard such as Zigbee. Zigbee typically is used with small, low power applications and simple communication. Node 14 for such a network can be a device of many different types, e.g., an industrial control device, medical device, smoke and intruder alarm, home automation device, etc. One node 14, such as gateway device 16, can act as a coordinator as the root of the network and bridge to other networks, and other devices may be able to relay information to other devices in the network, or not, depending on the included functionality. In still other embodiments, the network 12 can be an Ethernet LAN or implemented with a different protocol.

Figure 3:
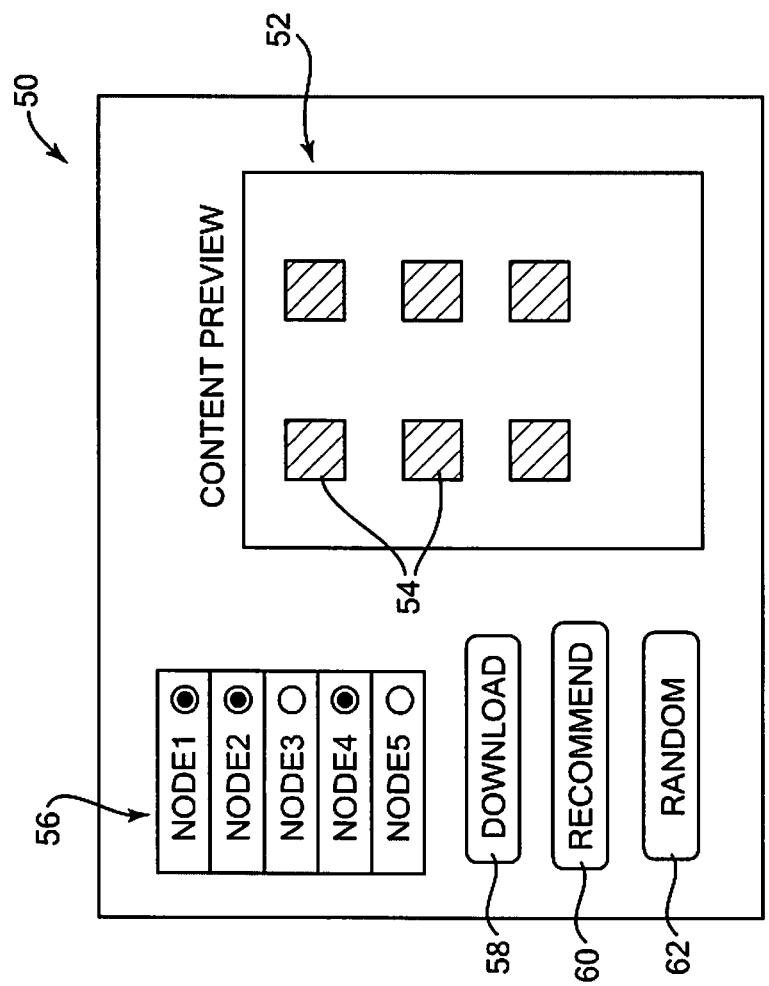
FIG. 3 is a diagrammatic illustration of a user interface for selecting content download options according to the present invention.

FIG. 3 is a diagrammatic illustration of an example of a user interface 50 that can be displayed by a display on the gateway device 16 to allow the user to control the downloading of content from the remote server 30. For example, the interface 50 can be displayed on an LCD display or other display screen of the device 16.

A display field 52 can be provided in the user interface to display a list of available content, from which the user can select or designate particular content that the user wishes to download to the network 12 from the remote server 30. This content can be represented, for example, by metadata such as icons or thumbnails 54. Each thumbnail 54, if representing an image, can be a reduced-size version of the image it represents. Additional metadata for each content item can also be displayed, such as a title of the content, date it was created or made available for download, category it is included in (e.g., subject matter, date category, subject, id tag, etc.), or content type (image, movie, audio, etc.).

The content list displayed in field 52 can be provided in a recommendation list, which is a list of content recommended by the server 30 based on settings for the user and destination nodes for the content, such as prior downloading history, preferences, and/or other characteristics. Play lists that list a number of content items to be played in a particular sequence can also be displayed in field 52.

The user can select particular desired content displayed in the field 52 using a user interface device of the gateway device 16, such as one or more keys, a mouse, stylus, or other input device. Selected content can be designated by highlighting it, marking it, or by other visual indicator. In some embodiments, a folder hierarchy can be displayed in field 52 or a separate field (not shown), which can allow the user to navigate different hierarchies and/or categories of content as stored on the server and select the desired content to download.

The selected content can begin to be pulled from the server over network 28, when the user selects a particular control, such as a download button 58. In some embodiments, the user can alternatively select a control to request recommended content or a recommendation list of content from the server; for example, a recommend button 60 can be selected by the user. In still other embodiments, the user can select a control request random content, as selected randomly by the server from database 32; for example, a random button 62 can be selected by the user. Other types of controls can be used in other embodiments.

In the described embodiments, a list 56 of nodes corresponding to the nodes 14 of network 12 are displayed to show which devices are currently connected to the network 12. These are thus the nodes which can receive content from the remote server 30. Node 1, for example, can be the gateway device 16 itself, while the other nodes can be the other nodes 14 as shown in FIG. 1. In a particular embodiment, additional identifying information can be displayed for the nodes 14 in interface 50, such as a name and/or type of each device at each node.

Using a user interface device, the user can select which of the nodes in the list 56 he or she wants to receive the content designated in the field 52, i.e., select the destination nodes. The user can select destination nodes here also if requesting recommendations or random content, to assist the server in determining that content. When received by the gateway device 16, the downloaded content will be provided from the gateway device 16 to the selected nodes in list 56 via network 12.

Figure 4:
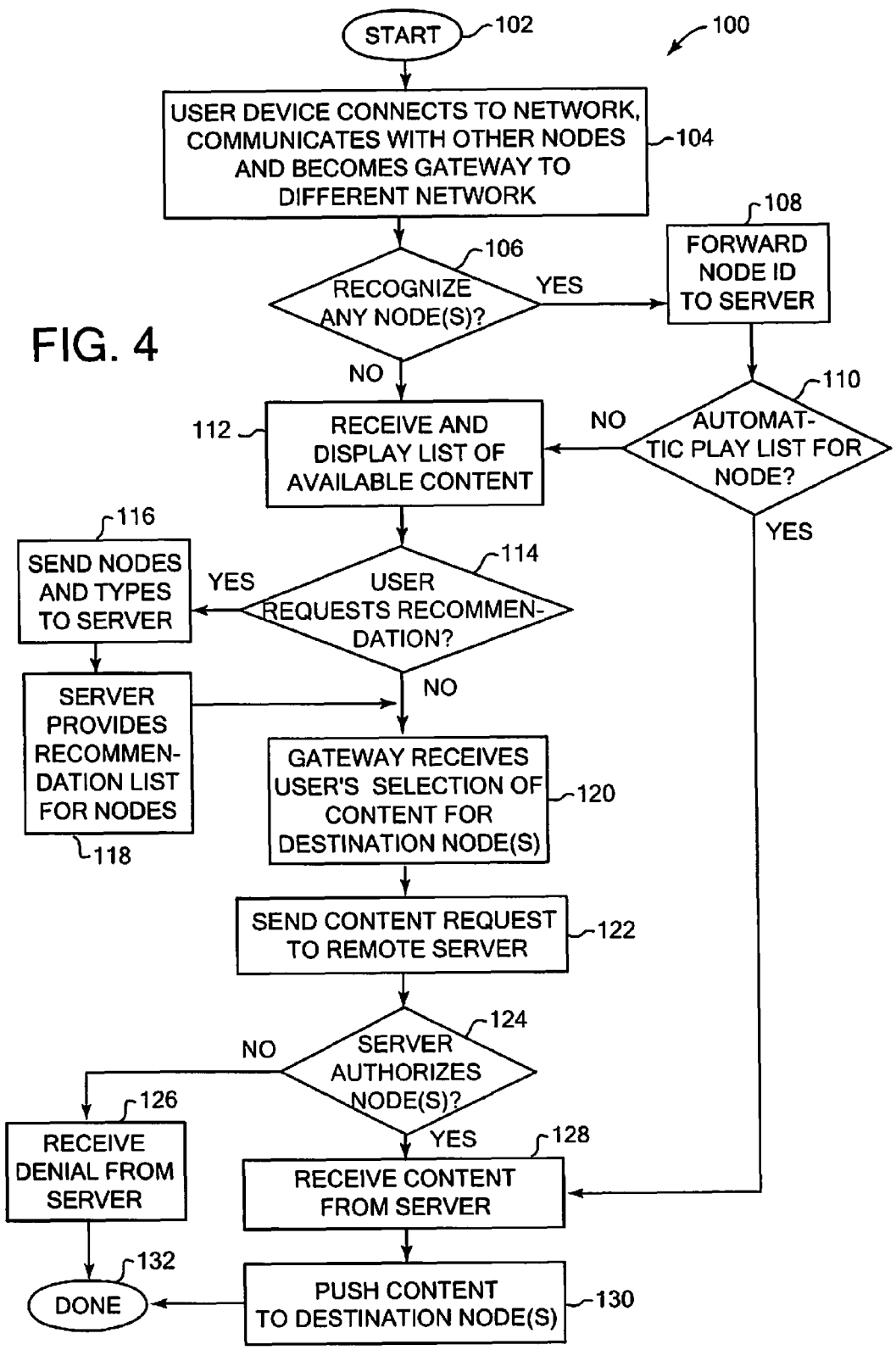
FIG. 4 is a flow diagram illustrating a method of the present invention for requesting content from a content server using a gateway device on a different network.

FIG. 4 is a flow diagram illustrating a method 100 of the present invention for requesting content from a content server using a gateway device on a different network. Method 100 (and other methods described herein) can be implemented in software and/or hardware using program instructions or code stored on a computer readable medium, such as memory, hard disk, CD- or DVD-ROM, or other medium, and performed by a computer device.

The method begins at 102, and in step 104, the user's computer device connects to the network 12, communicates with other nodes, and becomes a gateway to a different network. In a WPAN embodiment as described above for FIG. 1, the connecting to the network can be established by moving the user's computer device (such as a cell phone or PDA 16) into range of the network 12, which can wirelessly connect with the user's device automatically using a protocol such as Bluetooth and implementing BIPs. In other embodiments, the connection can be established by moving the device into range of a wireless WiFi network 12 and authenticating and connecting to the network, or even physically connecting the user's device to the network 12, e.g., via an Ethernet cable for an Ethernet LAN 12.

The user's device communicates with the other nodes 14 of the network 12. For example, using a protocol such as Bluetooth, the user's device can pair up with each other node in sequence, establishing the network connection between itself (the master) and each device on the network 12 (the slaves).

When the user desires to create a gateway 17, the user starts up the gateway functionality on the device 16 (alternatively, the gateway 17 can automatically start, or have previously been started). The device 16 establishes itself as the gateway device 16 providing the gateway 17 to a different network 28, such as the Internet 28. The device typically uses a different protocol than the protocol used in network 12, such as WiFi (IEEE 802.11), to connect to the network 28. The device 16 then establishes a connection over the network 28 to the remote content server 30. The connection to the server 30 can be established automatically (e.g. according to predetermined user preferences stored on the gateway device 16), or in other embodiments or settings, the connection is established only when the user actively selects that the connection be made. In alternative embodiments, another node on the network (not the user's device that has just connected) can be established as the gateway device 16 with the gateway 17 to the network 28.

In next step 106, the gateway device 16 checks whether it recognizes any nodes on the network 12. The gateway device can store a list of nodes from networks like network 12 (e.g., a PAN) that it has previously communicated with or paired with. If any nodes of network 12 match nodes in the list, then the gateway device has communicated with that node before (it is a "recognized" node), and the process continues to step 108, in which the gateway device forwards the node identifications (IDs) for the recognized nodes to the server 30 via network 28. In next step 110, it is determined at the server whether there is any automatic play list for any of the forwarded identified nodes. An automatic play list directs the server to automatically push designated content to the gateway if those nodes communicate with the gateway device 16 on network 12, as described below with respect to FIG. 5. If automatic play lists are found by the server, then the process continues to step 128, where the gateway device 16 receives the content in the automatic play list from the server 30 over the network 28. The process then continues as detailed below.

If no nodes are recognized in step 106, then the process continues to step 112, in which the gateway device receives a list of available content on the server 30 and displays that list. The list of content can take the form of metadata describing the content items available on the database 32 of the server 30. One example of a display of available content is described above with respect to FIG. 3, where the content is listed as icons or thumbnails in a field 52.

In next step 114, the gateway device checks whether the user has requested a recommended list of content from the server 30. The user can request a recommended list using a control of the user interface, an example of which is shown in FIG. 3. Alternatively, the server 30 can always provide a recommendation list of content in step 112. If no recommendation list is requested, the process continues to step 120, detailed below. If a recommendation list is requested, then in step 116, the destination nodes and types of device at those nodes are provided to the server from the gateway device. The user designated which destination nodes would receive the recommended content, e.g., using a user interface 50 of the gateway device. Alternatively, if the user designated no destination nodes, then the server can assume a default condition, e.g., that the destination node is the gateway device, or is all nodes, or that a general recommendation list will be provided, independent of any destination node.

In step 118, the server provides a recommendation list of content over the network 28 which is displayed by the gateway device 16 to the user. This recommended list of content is intended for the destination nodes indicated by the user (if any). The server can provide a recommendation list based on settings for the destination nodes. Also, the server can provide a recommendation list based additionally on previous settings associated with the user or current commands from the user, such as additional filters for the content to be downloaded, e.g., only particular categories. Or, the gateway device 16 can provide additional filters or can throttle the request based on the capabilities of the gateway device to handle the load coming from the server. The term "settings" herein refers to any of a variety of predetermined user preferences and/or characteristics associated with the destination node or type of device at the destination node, including actions to be performed based on particular criteria or conditions, previous history of downloads, an association of content with the destination node, a genre (i.e., classification) of content associated with the node, and other criteria. This is described in greater detail with respect to FIG. 5. The process then continues to step 120.

In some embodiments, the server can also provide play lists for the designated destination nodes in a recommendation list. The play lists may have been previously set up by the user for the destination nodes on the server. Play lists are a listing of content items that the user has previously designated to be played in a particular sequence. The user can associate play lists with particular nodes, or with particular device types at the nodes, so that the server will recommend a play list if those particular node or device types are designated as destination nodes for content. The server can also recommend particular play lists based on associated settings, including destination node, type of device, subject matter classification, etc. Alternatively, the server can recommend play lists if any nodes associated with the play lists are detected in the network 12, whether they have been designated as destination nodes or not.

In step 120, the gateway device receives the user's selection of content from the displayed list of content, and the destination nodes that are to receive that content. If no recommendation list was requested in step 114, then the user can select from the list of content displayed in step 112 and select the desired destination nodes on network 12. If a recommended list of content was requested in step 114, the user can select from the recommended list and select the destination nodes. If play lists were provided by the server, the user can select any of the play lists. The user can select desired content for download using an interface device of the gateway device 16, (or, alternatively, using an interface of a connected node 14). The user's selection of content for download is considered to be a content request for the server. The user may not need to manually select a destination node if there is only one node 14 in the network, for example; the destination can be assumed.

In other embodiments, the user does not have to manually select content for download. For example, in some embodiments, when the user selects a "recommend" control such as button 60 of FIG. 3, the server will not provide a recommendation list, but will simply start pushing recommended content. In other embodiments, the user can only designate one or more destination nodes that will receive content, and the server will then select content automatically based on stored preferences, play lists, or other settings as previously created by a user for those nodes and stored on the server 30 (or alternatively stored in the gateway device cache 16). In still other embodiments, the user/gateway device can provide an indication that the server is to follow some other setting or user preference to determine which content to download, rather than the user manually selecting any particular content. In yet another embodiment, a content request can be made automatically by the gateway device 16, based on the user configuration of preferences or settings stored on the content server 30, or on the gateway device 16.

In other embodiments, the user's or gateway device's selection in step 120 can be a request for randomized content from the server 30, i.e., content that is selected randomly by the server, where the user provided the request using the gateway device interface, such as the random button 62 of FIG. 3. The user can select the destination nodes and then request random content. In some embodiments, the user can also designate that the requested randomly-selected content be new content that has never been previously pushed to the indicated destination nodes, or has not been pushed to those nodes within a designated time period; or these options can be the stored settings for the user on the server 30.

In step 122, the content request made by the user in step 120 is sent to the remote server 30 over the network 28 (such as the internet). The content request can include selected content items or play lists, or a request for random content or recommended content, as described above. The content request includes the node network identifications (IDs) for the destination nodes, as well as the types of devices at those destination nodes. The gateway device 16 can collect the network IDs and type of the device at each destination node before sending out the content request (if this information was not collected earlier). Each network ID identifies a particular node within network 12, where each network ID is unique. For example, a Bluetooth device ID, Media Access Control (MAC) address, or other identification used on network 12 can be used as the network ID. The type of the device at the node indicates what types of media content that node device is able to process. For example, an MP3 player would have an "audio" type to indicate that it can play or output audio content. An LCD screen device can have "image" and "video" types to indicate it can output visual media content, such as images, slide shows, and movies.

In step 124, it is determined by the server whether the destination node(s) are authorized to receive the desired content from the server 30, based on the node network ID(s) provided to the server (explained below in FIG. 5). If none of the destination nodes are authorized, then the process continues to step 126, in which a denial is received at the gateway device 16 from the server, indicating that the requested content cannot be downloaded. The process is then complete at 132.

If one or more of the destination nodes are authorized as indicated by the server, then the process continues to step 128, in which the requested content is received from the server. As explained above, this content may have been selected by the user, or automatically determined or recommended by the server 30 based on settings. In next step 130, the gateway device 16 pushes the received content to the destination node(s). In some embodiments, the gateway device 16 can cache all or part of the content before pushing it to the destination nodes. Also, in some embodiments, the content can be streamed to the gateway device 16 and each packet of the content can be forwarded to the destination node right after it is received from the server at the gateway device. The gateway device 16 also blocks the pushing of the content to those destination nodes 14 that were not authorized to receive the content (the server 30 can indicate unauthorized nodes 14 to the gateway device). The process is then complete at 132.

In some embodiments, the gateway device 16 may have cached content from a previous download. If a node on the network 12 then requests the content that is fully cached, the content need not be downloaded from the server 30, but can be pushed to the node from the gateway's cache. Partial content stored in the cache can also be retrieved from the cache, with the remainder of the content downloaded from the content server 30.

Figure 5:
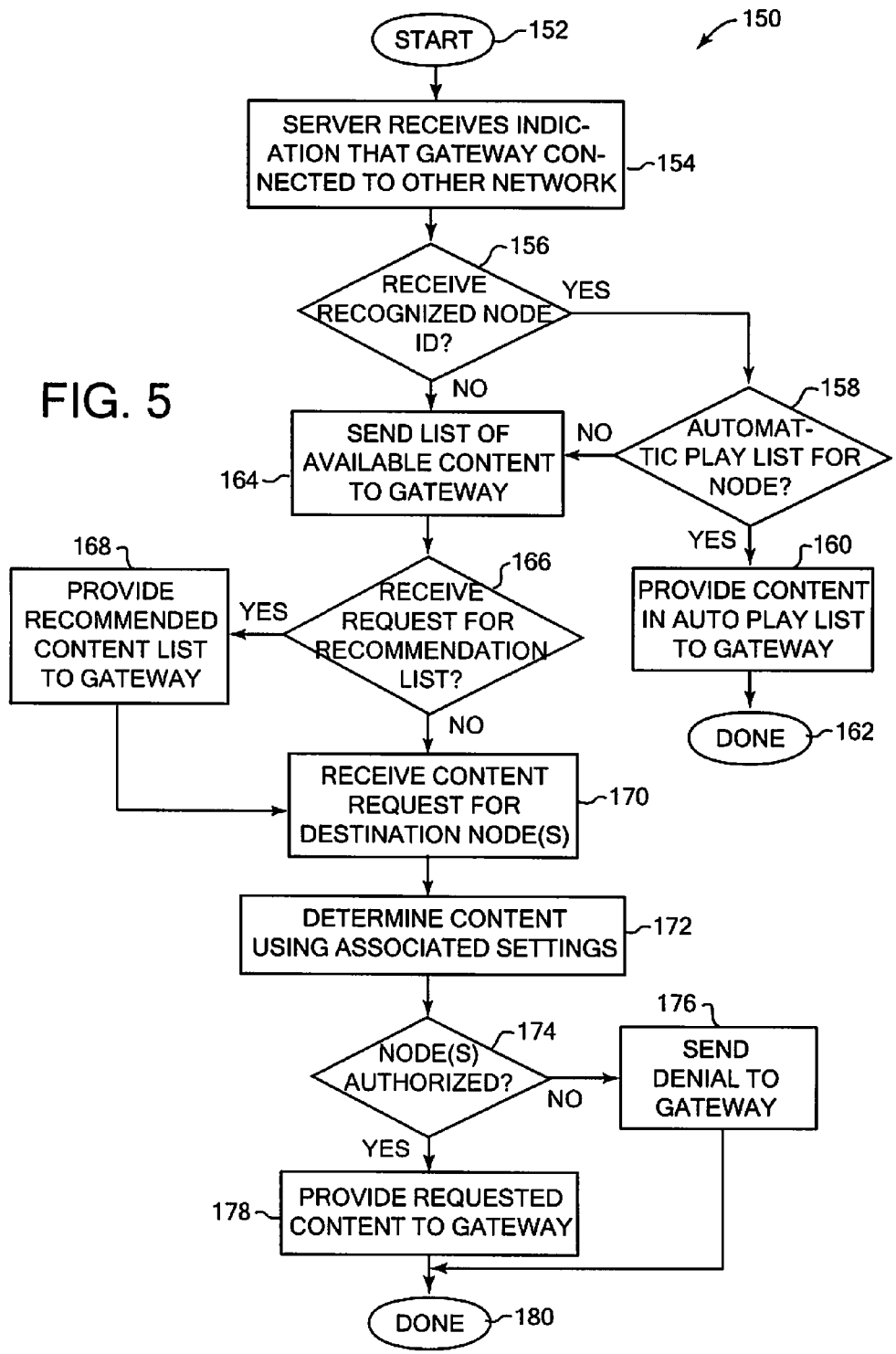
FIG. 5 is a flow diagram illustrating a method of the present invention for providing requested content from a content server to a gateway device that is in communication with nodes in another network.

FIG. 5 is a flow diagram illustrating a method 150 of the present invention for providing requested content from a content server to a gateway device that is in communication with nodes in another network. The method begins at 152, and in step 154, the content server 30 receives an indication that the gateway device 16 has connected to the other network 12. (It is assumed here that the gateway device 16 has already connected with and been authenticated with the server 30). In step 156, the server checks whether it has received any recognized node IDs from the gateway device. As described above, recognized node IDs are IDs of nodes that the gateway device has previously communicated with and thus may have been set up with an automatic play list by the user, and so the gateway device will forward these to the server 30. If any such node IDs are received, then in step 158 the server checks if any of the received node IDs have associated automatic play lists; such associations are stored by the server. If no automatic play lists are found for the recognized nodes, then the process continues to step 164, detailed below.

If one or more automatic play lists are found, then in step 160, the server provides the content listed in the automatic play list to the gateway device, and the process is complete at 162. As described with respect to FIG. 4, the gateway device 16 will push this received content to the recognized nodes associated with the play list content (which are the destination nodes), where the content will be appropriated processed. For example, when the user's cell phone gateway device 16 connects with a PAN 12 including a recognized audio stereo node 14, an automatic play list of music data content stored on the server 30 can be automatically downloaded to the cell phone and forwarded to the stereo, where the music data will be played for the user.

If no recognized node IDs are received in step 156, then in step 164, the server sends a list of available content to the gateway device 16. Depending on the implementation, this available content can be all of the content in the database 32, or a subset thereof, as dictated by user access, user preferences, etc. In some embodiments, the server 30 can include a search engine, to allow users of a gateway device 16 to search for particular content of interest to them using search terms or the like, e.g., the metadata for each content item can be searched.

In next step 166, the server checks whether it has received a request for a recommended list of content. As described above, the user may request recommendations from the server for particular destination nodes. In the case of step 166, the process checks for a request for a list of recommended content items, from which the user may select items to download. The recommendation list request can be accompanied by the destination nodes that the user wishes to send the recommended content to (and optionally the device types at those destination nodes). If no recommendation list request has been received, the process continues to step 170, detailed below.

If such a recommendation request is received, then in step 168 the server determines the recommended list of content and provides the recommended list to the gateway device 16 over the network 28. The process then continues to step 170, detailed below. The server determines the recommended content list based on one more settings, including preferences and/or prior history. For example, the server can store a description or list of the content that was previously selected and pushed to that destination node, which can be used as a guide for new recommended content for that node that the server searches for in the database 32. In one example, if images from a particular photo album in the content database have been previously pushed to that node, the server can recommend new content that has been stored in that photo album since the latest previous download to that node.

The server can also store other characteristics of the previous history of downloads to the associated destination node; for example, particular attributes of previous downloaded content for that node, such as titles, tags, type, subject matter, etc., can be stored. Statistical or overall data derived from previous history can also be stored, such as whether all content downloaded to that destination node have similar attributes, and what those attributes are. For example, if previous downloads images that were tagged or had titles of "dog" were the only content pushed to particular destination nodes, this fact can be stored by the server and used to recommend additional content.

Recommendations can also be based on settings such as predetermined user preferences, or associated settings for that node or node type (for types of content that can be played by the device at that node, e.g., video, audio, still images, text, etc.), e.g., stored by the server. For example, the user may have made particular associations between content classifications or genres and particular nodes on network 12 (or other networks like network 12). For example, the user may have associated a classification of jazz music with a particular node that is a music player. The server can recommend content from a designated jazz music classification for that destination node (e.g., by looking in a subject hierarchy of content, examining subject tags for content, etc.)

In some embodiments, if the user provided a request for randomized content, then the recommendation list can be a list of the randomly-selected content which can be approved by the user before it is actually pushed to the gateway.

In some embodiments, recommendation lists can automatically be provided by the server, instead of being requested by the user. For example, such recommendation lists can be made whenever the gateway contacts the server, or recommendation lists can automatically be provided only if there is new content in a section or category of the content database from which a user or node has previously downloaded content, or based on some other predetermined criteria. In some embodiments, the recommended content can also be automatically selected and downloaded to the gateway device, without any user input.

The recommended content list can take the form of a list of metadata that describes the content, e.g., a thumbnail image to represent an image or a movie, a title for audio content or a text document, etc. The recommended content list is preferably displayed or otherwise output to the user of the gateway device 16. Other associated metadata can also be displayed, such as time of creation for a content item, the user that created the content item, etc.

In step 170, the server receives the content request from the gateway device 16 that indicates which content is to be downloaded for the designated destination nodes, the receiving side to the sending step 122 of FIG. 4. This content request includes the selections of the user of specific content items from the list of content provided in step 164, selections of one or more play lists, and/or selections from a recommendation list of step 168. If the user did not specifically select any content items, the request may be for randomly-selected content, or for recommended content without viewing a recommendation list, or for content to be determined based on user-indicated (or non-indicated, overall) settings of the user and/or destination node. Also included in the content request are the destination nodes which will receive the requested content and the types of devices at those destination nodes.

In step 172, the server determines the content to be provided to the gateway device using settings associated, typically, with the destination nodes. This step need only be performed if the user has requested that the server determine some or all of the requested content, e.g., if the user requested randomly-selected content, recommended content (which was not already determined for a list in step 168), or content based on user or node settings. If all the requested content was explicitly selected as particular content items by the user, then this step can be skipped and the process continue to step 174.

To determine the content to be pushed to the gateway device, the server can examine stored settings associated with the destination node(s). The settings can be stored in the database 32 and the particular information accessed is associated with the network ID that uniquely identifies the destination node. The stored settings can include user preferences, prior downloading history, and other downloading criteria and procedures for the associated destination node. User preferences for the node can be stored by the server, such as a predesignated association of the type of device at the destination node with particular content, or an association of the destination node (or node device type) with content subject matter, content types, titles, or other criteria by a user who has access to the destination node. Such settings can also include play lists created by the user; and multiple play lists can be played in a predetermined order, or based on other criteria.

If the user has requested randomly-selected content, then the server can randomly select content items in the database 32 according to the associated settings, such as user-specified criteria, stored preferences, and/or prior downloading history for the destination node. For example, the content can be selected randomly by the server from particular categories previously designated by the user, based on content characteristics such as type of media, subject matter, date of creation, and/or other criteria.

Once the requested content to be provided is determined, then in step 174, the server checks whether the destination node(s) are authorized to receive the content. For example, this can be accomplished by comparing the received destination node network IDs to a stored list of network IDs of nodes/devices that are authorized for the desired content. A stored list of authorized nodes/devices can be associated with each item of content, as predesignated by an authorized user. Alternatively, a list of authorized nodes can be designated for a whole category or group of content items. The authorizations can be determined by the user who created the content, by other users who have control over the content, or by an automatic process on the server according to predetermined guidelines and criteria. In one embodiment, users can become authorized with a particular server or service by registering with the content server over the internet 28, and/or downloading and installing gateway application software (e.g., that provides interface 50 of FIG. 3) that runs on a gateway device 16. Alternatively, a user can designate particular content as available to any user or node, or only to specific designated users or nodes or node types. Authorization may not be needed for content that the server determined and/or recommended, if the server authorized the destination nodes during the recommendation or determination process.

If none of the destination nodes are authorized, then the process continues to step 176, in which the server sends a denial to the gateway device 16 over the network 28 to indicate that the content cannot be downloaded to the destination node(s). The process is then complete at 180.

If at least one of the destination nodes is authorized, then in step 178, the server provides the requested content over the network 28 to the gateway device 16. The process is then complete at 180.

The present invention offers a convenient way to download content to network devices in a customized manner. The server can offer recommendations or other customized content based on settings specific to each destination node. Since the settings for nodes and node types can be stored at the server, the user can move a gateway device from one network 12 to a different network 12, and the server will know settings for types of devices at nodes in either network and thus be able to recommend and determine content in either network for destination nodes for which it may not have any predetermined settings, but for which it has settings based on the type of device at those nodes. Furthermore, the user can use different gateway devices 16 and use the same settings for a destination node. In this way, the user's downloading preferences can be recalled across different networks 12 and different gateway devices 16.

Example Scenario

As an example of the invention described above, a user has a PDA that can communicate using Bluetooth with Bluetooth devices, and can communicate with the internet or a local area network using WiFi. The PDA implements the Bluetooth Basic Imaging Profile (BIP). The user physically enters a Class 2 Bluetooth PAN, which has about a 10 meter range. Within the PAN, there is an LCD monitor device at one of the nodes 14, which also implements the Bluetooth BIP.

The user wishes to display a large image slide show on the LCD monitor. The user starts up the gateway 17 on the PDA, which will act as the gateway device 16. Using WiFi, the gateway connects to the remote content server 30, receives a list of available content, and displays thumbnail images that represent the available content—in this case, image slide shows. The gateway device 16 also displays a list of the available Bluetooth devices 14 on the PAN 12. The user selects the particular slide show he or she wants to download, and selects the LCD monitor node 14 from the list of available nodes. Using WiFi, the gateway 17 pulls the slideshow images from the remote server 30 and using the Bluetooth BIP, pushes the images to the LCD monitor, which displays the images as a slide show.

Alternatively, using the gateway device interface, the user could have requested a recommendation list from the server as to which content to download for the selected LCD monitor. The server would receive the LCD monitor node ID and the type of the device (image and movie), and could examine any prior history of downloads for that device, and/or stored user preferences for that device. For example, if only image slide shows had previously been downloaded to the LCD monitor, the server could recommend only image slide shows. If slide shows having a subject tag of "vacation" were only downloaded, the server could recommend any new slide shows having that same subject tag. If the LCD monitor had no prior downloading history, the server could recommend images, slide shows, and movies, based on the type of device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for receiving content at nodes on a network, the method comprising:

establishing a mobile personal communication device as a gateway device for a plurality of destination nodes in a first network, the gateway device operative to communicate in the first network and communicate with a server in a second network;

receiving, at the gateway device, a content list for display at the gateway device, the content list being stored on a database at the server and listing a plurality of multimedia content items available for interaction on at least one destination node of the plurality of destination nodes;

receiving, at the gateway device, a destination node listing for display at the gateway device;

selecting, at the gateway device, a multimedia content item of the plurality of multimedia content items from the content list displayed at the gateway device;

selecting, at the gateway device, the at least one destination node of the plurality of destination nodes as a destination node to receive the multimedia content selected at the gateway device; and communicating with the server from the gateway device to make a request for the multimedia content item selected at the gateway device to be provided to the at least one destination node of the plurality of destination nodes in the first network, wherein the requested multimedia content item is stored at the server.

2. The method of claim 1, wherein the requested multimedia content is based on stored settings for the at least one destination node.

3. The method of claim 2 wherein the stored settings for the at least one destination node include user preferences for the at least one destination node.

4. The method of claim 3 wherein the user preferences include an association of a content genre with the at least one destination node.

5. The method of claim 2 wherein the stored settings for the at least one destination node include a prior history of content received at the at least one destination node.

6. The method of claim 2 wherein the stored settings for the at least one destination node include an association of content with a type of device at the at least one destination node.

7. The method of claim 2 wherein the request for the multimedia content item includes a request for recommended content, the recommended content determined by the server based on the stored settings for the at least one destination node, the stored settings being stored at the server, where the requested content is the recommended content.

8. The method of claim 7 further comprising receiving a recommendation list from the server before receiving the recommended content, and receiving a selection from a user at the gateway device of at least one content item indicated in the recommendation list, the selection providing the request for content provided to the server.

9. The method of claim 1 wherein the first network is a wireless network.

10. The method of claim 9 wherein the gateway device collects a network identification and type of device for the at least one destination node and provides the network identification and the type of device to the server with the request for content.

11. The method of claim 1 wherein the destination node listing includes a list of the plurality of destination nodes.

12. The method of claim 11 wherein a user of the gateway device uses an interface of the gateway device to select which of the plurality of destination nodes of the first network are to receive the requested content.

13. The method of claim 1 further comprising:
    determining if any of the nodes of the first network are recognized nodes that have previously been communicated with by the gateway device; and
    providing node identifications associated with the recognized nodes to the server to determine if there are any automatic play lists of content for the recognized nodes, the automatic play lists of content causing the server to automatically provide content in the automatic play lists to the gateway device.

14. The method of claim 1, wherein the mobile personal communication device is selected from a group consisting of a cellular telephone, a personal data assistant, a desktop computer, and a gaming device.

15. A method for providing content at nodes on a network, the method comprising:
    sending to a gateway device for a plurality of destination nodes in a first network, a content list stored on a database at a server for display at the gateway device, the content list listing a plurality of multimedia content items available for interaction on at least one destination node of the plurality of destination nodes;
    receiving a request at the server from the gateway device for a multimedia content item of the plurality of multimedia content items selected at the gateway device from the content list stored at the server, wherein the gateway device is a mobile personal communication device and is operative to communicate with the first network and communicate with the server via a second network; and
    receiving at the server from the gateway device an identification of the at least one destination node in the first network selected at the gateway device from a destination node listing displayed at the gateway device, wherein the at least one destination node is to receive the requested multimedia content item.

16. The method of claim 15 wherein the requested multimedia content is based on settings stored at the server for the at least one destination node.

17. The method of claim 16 wherein the stored settings for the at least one destination node include user preferences for the at least one destination node.

18. The method of claim 16 wherein the stored settings for the at least one destination node include a prior history of content received at the at least one destination node.

19. The method of claim 16 wherein the request for the multimedia content item includes a request for content that is randomly selected by the server, and further comprising randomly selecting content from a database of the server to be provided as the requested content, the random selection based on the stored settings for the at least one destination node.

20. The method of claim 15 further comprising receiving a network identification and a type of device for the at least one destination node.

21. A non-transitory computer readable medium including program instructions to be implemented by a computer, the program instructions for receiving content at nodes on a network, the program instructions implementing steps comprising:
    establishing a mobile personal communication device as a gateway device for a plurality of destination nodes in a first network, the gateway device operative to communicate in the first network and communicate with a server in a second network;
    receiving, at the gateway device, a content list for display at the gateway device, the content list being stored on a database at the server and listing a plurality of multimedia content items available for interaction on at least one destination node of the plurality of destination nodes;
    receiving, at the gateway device, a destination node listing for display at the gateway device;
    selecting, at the gateway device, a multimedia content item of the plurality of multimedia content items from the content list displayed at the gateway device;
    selecting, at the gateway device, the at least one destination node of the plurality of destination nodes as a destination node to receive the multimedia content selected at the gateway device; and
    communicating with the server from the gateway device to make a request for the multimedia content item selected at the gateway device and stored at the server to be provided to the at least one destination node of the plurality of destination nodes in the first network.

22. The non-transitory computer readable medium of claim 21 wherein the request for the multimedia content item includes a request for recommended content, the recommended content determined by the server based on the stored settings for the at least one destination node, the stored settings being stored at the server.

* * * * *